US012797948B2

(12) United States Patent
Imahase et al.

(10) Patent No.: US 12,797,948 B2
(45) Date of Patent: Nov. 17, 2026

(54) SLIDING NOZZLE APPARATUS

(71) Applicant: KROSAKIHARIMA CORPORATION, Fukuoka (JP)

(72) Inventors: Toshihiro Imahase, Fukuoka (JP); Akira Otsuka, Fukuoka (JP); Takeshi Fujimoto, Fukuoka (JP)

(73) Assignee: KROSAKIHARIMA CORPORATION, Fukuoka (JP)

( * ) Notice: Subject to any disclaimer, the term of this patent is extended or adjusted under 35 U.S.C. 154(b) by 320 days.

(21) Appl. No.: 18/832,627

(22) PCT Filed: Jan. 12, 2023

(86) PCT No.: PCT/JP2023/000628
§ 371 (c)(1),
(2) Date: Jul. 24, 2024

(87) PCT Pub. No.: WO2023/145464
PCT Pub. Date: Aug. 3, 2023

(65) Prior Publication Data

US 2025/0091124 A1 Mar. 20, 2025

(30) Foreign Application Priority Data

Jan. 26, 2022 (JP) ................................ 2022-010447

(51) Int. Cl.
*B22D 41/24* (2006.01)
*B22D 41/28* (2006.01)
(Continued)

(52) U.S. Cl.
CPC ............ *B22D 41/24* (2013.01); *B22D 41/28* (2013.01); *B22D 41/34* (2013.01); *F27D 3/14* (2013.01)

(58) Field of Classification Search
CPC ........ B22D 41/24; B22D 41/28; B22D 41/34; F27D 3/14
See application file for complete search history.

(56) References Cited

U.S. PATENT DOCUMENTS 9,782,826 B2 * 10/2017 Funato ..................... F27D 3/14
2008/0272157 A1 * 11/2008 Kondo .................. B22D 41/40 222/591
2011/0101041 A1 * 5/2011 Funato .................. B22D 41/40 222/591

FOREIGN PATENT DOCUMENTS

JP 2011-212704 A 10/2011
JP 2016-64439 A 4/2016

OTHER PUBLICATIONS

International Preliminary Examination Report on Patentability dated Jul. 30, 2024 with Written Opinion for PCT/JP2023/000628 filed Jan. 12, 2023.

(Continued)

*Primary Examiner* — Adil A. Siddiqui
(74) *Attorney, Agent, or Firm* — Fleit Intellectual Property Law; Paul D. Bianco

(57) ABSTRACT

A sliding nozzle apparatus includes a fixed metal frame, and a sliding metal frame which is provided openable-closable and slidable with respect to the fixed metal frame. When the sliding metal frame is opened, the sliding nozzle apparatus is erected such that a sliding direction of the sliding metal frame is oriented in a vertical direction. The fixed metal frame is provided with a fall prevention member, and the sliding metal frame is provided with an engagement member. The fall prevention member has a catching surface for catching the engagement member when the sliding metal frame is opened, in the uppermost position where the sliding metal frame is moved to the uppermost side in a state in which the sliding nozzle apparatus is erected such that the (Continued)

sliding direction of the sliding metal frame is oriented in the vertical direction.

7 Claims, 8 Drawing Sheets

(51) Int. Cl.
*B22D 41/34* (2006.01)
*F27D 3/14* (2006.01)

(56) References Cited

OTHER PUBLICATIONS

International Search Report dated Mar. 15, 2023 with Written Opinion for PCT/JP2023/000628 filed Jan. 12, 2023.

* cited by examiner

SLIDING NOZZLE APPARATUS

TECHNICAL FIELD

The present invention relates to a sliding nozzle apparatus which is attached to the bottom of a molten metal vessel such as a ladle, to adjust the amount of molten steel flowing out of the molten metal vessel.

BACKGROUND ART

A sliding nozzle apparatus is configured such that one of two or three plates made of a refractory material or refractory plates each having a nozzle hole is slid while the refractory plates are clamped together at a high pressure (while a surface pressure is applied or loaded therebetween), thereby changing the degree of nozzle hole opening to adjust the amount of molten steel flowing out of a molten metal vessel. This refractory plate to be slid is received in a sliding metal frame, wherein the sliding metal frame is provided openably and closably (openably-closably) with respect to a fixed metal frame so as to allow replacement of the refractory plates or the like during maintenance. The sliding metal frame is also provided slidably with respect to the fixed metal frame so as to allow the refractory plate received therein to be slid. Further, in order to slide the sliding metal frame, a drive device such as a hydraulic cylinder is coupled to the sliding metal frame (see, for example, Patent Document 1).

When the maintenance of such a sliding nozzle apparatus is performed, the sliding nozzle apparatus is placed in a maintenance field in a state in which it is erected such that a sliding direction of the sliding metal frame is oriented in a vertical direction. In this state, the driving device for sliding the sliding metal frame is located on the upper side or the lower side of the sliding unit, and the sliding metal frame is movable in an up-down direction. Then, when the sliding metal frame is opened and closed, the opening and closing of the sliding metal frame is generally performed in the lowermost position where the sliding metal frame is moved to the lowermost side.

On the other hand, there are cases where it is desirable to perform the opening and closing of the sliding metal frame in the uppermost position where the sliding metal frame is moved to the uppermost side. However, when the opening and closing of the sliding metal frame is performed in the uppermost position, there is a possibility that the sliding metal frame falls down to the lowermost position when the sliding metal frame is opened, leading to damage to the sliding nozzle apparatus.

CITATION LIST

Patent Document

Patent Document 1: JP 2016-64439A

SUMMARY OF INVENTION

Technical Problem

A technical problem to be solved by the present invention is to provide a sliding nozzle apparatus capable of preventing a sliding metal frame from falling down when the sliding metal frame is opened in the uppermost position where the sliding metal frame is moved to the uppermost side.

Solution to Technical Problem

According to one aspect of the present invention, the following sliding nozzle apparatus is provided.

A sliding nozzle apparatus comprising a fixed metal frame, and a sliding metal frame which is provided openably-closably and slidably with respect to the fixed metal frame, wherein the sliding nozzle apparatus is erected such that a sliding direction of the sliding metal frame is oriented in a vertical direction, prior to opening the sliding metal frame, wherein the fixed metal frame is provided with a fall prevention member, and the sliding metal frame is provided with an engagement member, wherein the fall prevention member has a catching surface for catching the engagement member, when the sliding metal frame is opened in an uppermost position where the sliding metal frame is moved to an uppermost side in a state in which the sliding nozzle apparatus is erected such that the sliding direction of the sliding metal frame is oriented in the vertical direction.

Advantageous Effects of Invention

The sliding nozzle apparatus of the present invention can prevent the sliding metal frame from falling down when the sliding metal frame is opened in the uppermost position where the sliding metal frame is moved to the uppermost side.

BRIEF DESCRIPTION OF DRAWINGS

FIGS. 1A and 1B are perspective views of a sliding nozzle apparatus according to one embodiment of the present invention, wherein FIG. 1A shows a state in which the degree of nozzle hole opening is fully closed, and FIG. 1B shows a state when a sliding metal frame is opened and closed with respect to a fixed metal frame.

FIGS. 2A and 2B are vertical sectional views of the sliding nozzle apparatus illustrated in FIGS. 1A and 1B, wherein FIG. 2A is a sectional view taken along A-A of FIG. 1B, and FIG. 2B is a sectional view taken along line B-B in FIG. 1B.

DESCRIPTION OF EMBODIMENTS

Figure 1A:
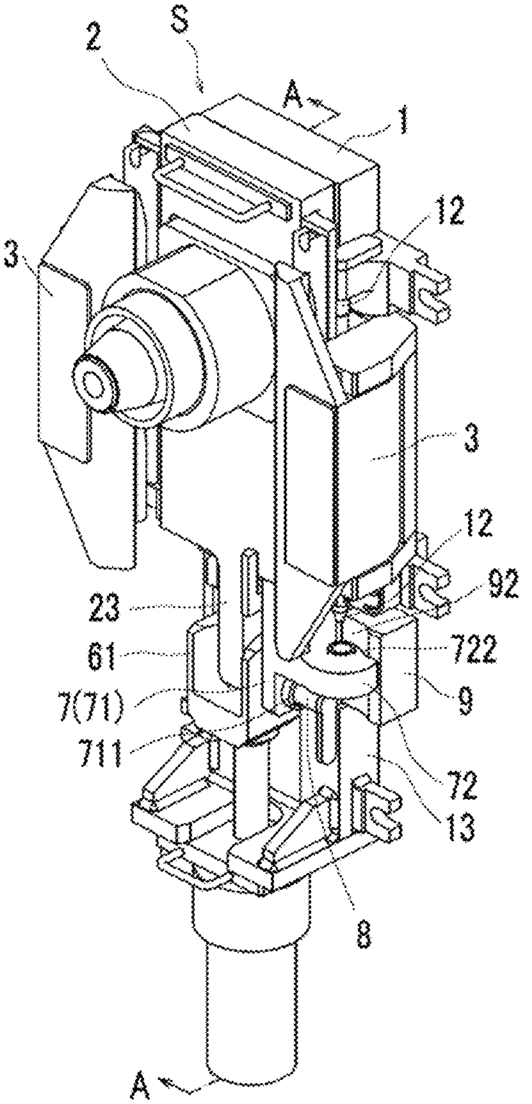
Figure 1B:
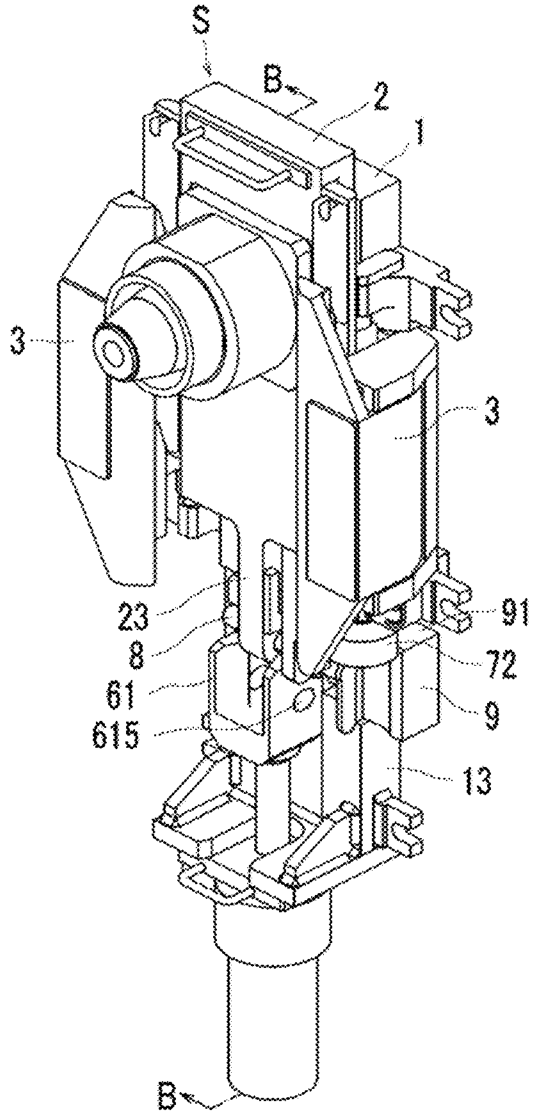
Figure 2A:
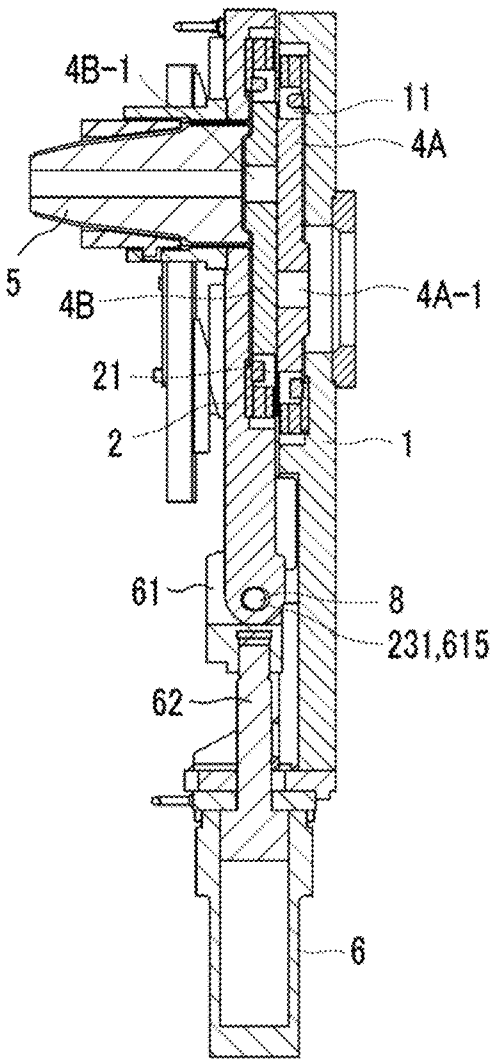
Figure 2B:
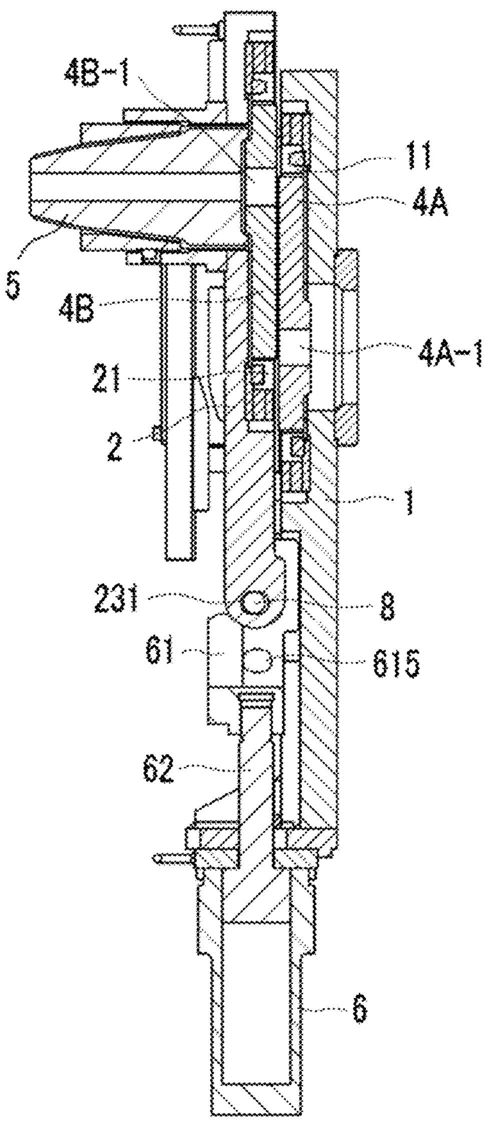
Figure 3:
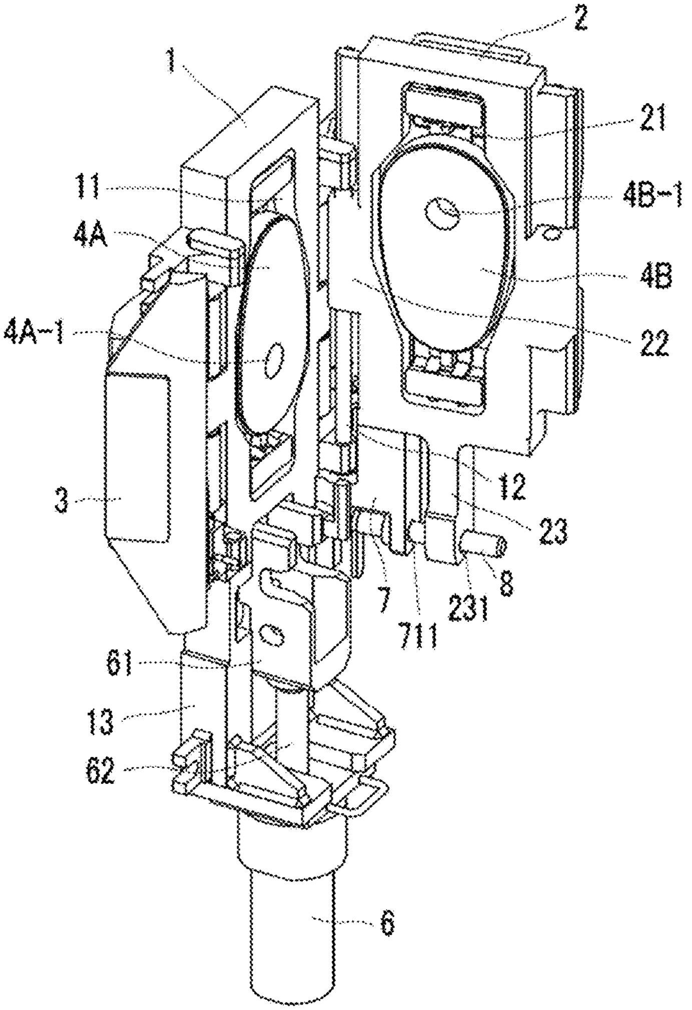
FIG. 3 is a perspective view of the sliding nozzle apparatus in a state in which the sliding metal frame is fully opened with respect to the fixed metal frame.

A sliding nozzle apparatus according to one embodiment of the present invention is illustrated in FIGS. 1A and 1B in the form of perspective views, wherein FIG. 1A shows a state in which the degree of nozzle hole opening is fully closed, and FIG. 1B shows a state when a sliding metal frame is opened and closed with respect to a fixed metal frame. The sliding nozzle apparatus illustrated in FIGS. 1A and 1B is also illustrated in FIGS. 2A and 2B in the form of vertical sectional views, wherein FIG. 2A is a sectional view taken along A-A of FIG. 1A, and FIG. 2B is a sectional view taken along line B-B in FIG. 1B. The sliding nozzle apparatus in a state in which the sliding metal frame is fully opened with respect to the fixed metal frame is illustrated in FIG. 3 in the form of a vertical sectional view. Since an operation of opening and closing the sliding metal frame is performed in a state in which the sliding nozzle apparatus is erected vertically as described above, FIGS. 1A, 1B, 2A, 2B, and3 illustrate the sliding nozzle apparatus in a vertically erected state. The same is also applied to FIGS. 4-14 which will be described later.

The sliding nozzle apparatus S according to this embodiment comprises a fixed metal frame 1, a sliding metal frame 2 which is provided slidably and openably-closably with respect to the fixed metal frame 1, and two spring boxes 3 which are swingably provided on both sides of the fixed metal frame 1.

The fixed metal frame 1 is an approximately rectangular plate-shaped member, and is formed with a plate-receiving recess 11 for receiving a refractory plate 4A therein. The fixed metal frame 1 is fixed to the bottom of a molten metal vessel such as a ladle, by a non-illustrated bolt.

The sliding metal frame 2 is also an approximately rectangular plate-shaped member, and is formed with a plate-receiving recess 21 for receiving a refractory plate 4B therein.

In the sliding nozzle apparatus S, a surface pressure is loaded between the refractory plate 4A mounted in the plate-receiving recess 11 of the fixed metal frame 1 and the refractory plate 4B mounted in the plate-receiving recess 21 of the sliding metal frame 2 in a state in which the refractory plate 4A and the refractory plate 4B are opposed to each other, and the amount of molten steel flowing out of the molten metal vessel is adjusted by sliding the sliding metal frame 4. More specifically, a nozzle hole 4A-1 and a nozzle hole 4B-1 are provided, respectively, in the refractory plate 4A and the refractory plate 4B, and the degree of nozzle hole opening formed by the overlap of the nozzle hole 4A-1 and the nozzle hole 4B-1 is changed by sliding the sliding metal frame 2, thereby adjusting the amount of the molten steel flowing out of the molten metal vessel. A lower nozzle 5 is joined to the refractory plate 4B.

Here, FIGS. 1(*a*) and 2(*a*) illustrate a state in which the degree of nozzle hole opening is fully closed. After use in a casting field or the like, the sliding nozzle apparatus is in the fully closed state. When the sliding nozzle apparatus is subjected to maintenance, it is carried in a maintenance field in the fully closed state, and is then erected such that a sliding direction of the sliding metal frame 2 is oriented in a vertical direction, as shown in FIGS. 1(*a*) and 2(*a*). In the following description, the position of the sliding metal frame 2 in the fully closed state will be referred to as a "fully closed position".

When the sliding metal frame 2 is opened to perform maintenance of the sliding nozzle apparatus in the maintenance field, the sliding metal frame 2 is moved to an opening-closing position which is a position above the fully closed position, as shown in FIGS. 1(*b*) and 2(*b*). This opening-closing position is the uppermost position where the sliding metal frame 2 is moved to the uppermost side.

In this embodiment, when the sliding metal frame 2 is in the fully closed position, a surface pressure is loaded between the refractory plate 4 A and the refractory plate 4 B. Then, when the sliding metal frame 2 is moved to the uppermost position, the surface pressure is released. Specifically, in this embodiment, the loading or releasing of the surface pressure is performed by means of movement of the sliding metal frame 2 along the sliding direction and the two spring boxes 3. Since a mechanism for loading or releasing the surface pressure by the movement of the sliding metal frame 2 along the sliding direction and the two spring boxes 3 is well known, description thereof will be omitted.

As appearing in FIG. 3, the fixed metal frame 1 is provided with a hinge shaft 12 for swingably and slidably supporting a hinge 22 of the sliding metal frame 2. Although not appearing in FIG. 3, the hinge 22 is provided with a through-hole for rotatably and slidably supporting the hinge shaft 12, and the hinge shaft 12 is inserted through the through-hole. That is, in this embodiment, the sliding metal frame 2 is openable and closable with respect to the fixed metal frame 1 by swinging about the hinge shaft 12 inserted through the through-hole of the hinge 22. Further, in this embodiment, the sliding metal frame 2 is slidable with respect to the fixed metal frame 1 by sliding along the hinge shaft 12 inserted through the through-hole of the hinge 22. The hinge shaft 12 is configured such that a lower end thereof appearing in FIG. 1A is inserted into the after-mentioned bearing hole 721.

The sliding nozzle apparatus S comprises a drive device 6 for sliding the sliding metal frame. In this embodiment, the drive device 6 is located below the sliding metal frame 2 in a state in which the sliding nozzle apparatus is erected such that the sliding direction of the sliding metal frame 2 is oriented in the vertical direction, and is installed on the side of the fixed metal frame 1 by a support frame 13. In this embodiment, a hydraulic cylinder is used as the drive device 6.

The sliding metal frame 2 comprises a connection portion 23 to be coupled with a coupling portion 61 of the drive device 6. The sliding metal frame 2 is provided with an engagement member 7 although the details thereof will be described later. Further, a pin is removably inserted through the connection portion 23 and the engagement member 7 to couple the connection portion 23 and the engagement member 7 together (this pin will hereinafter be referred to as "coupling pin"). In this embodiment, the coupling pin 8 is removably inserted through a through-hole 231 provided in the connection portion 23 and a through-hole 711 provided in a member body 71 of the engagement member 7.

The coupling portion 61 of the drive device 6 is fixed to a distal end of the drive shaft 62 of the drive device 6.

Figure 4:
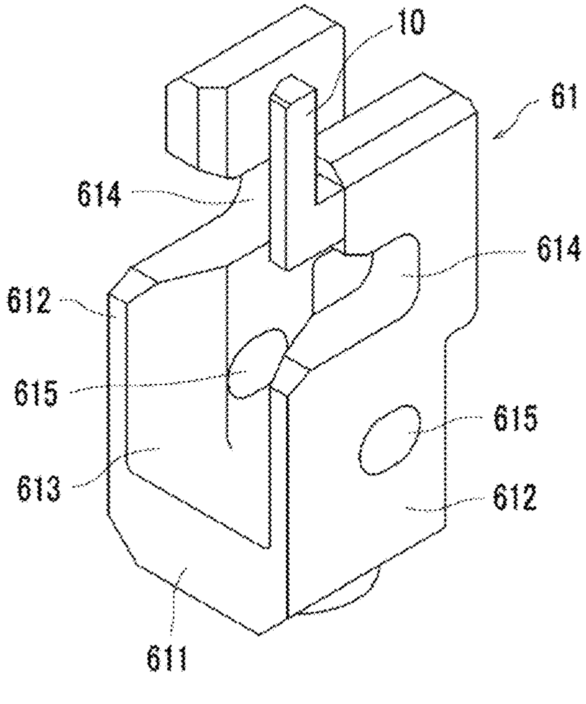
FIG. 4 is a perspective view of a coupling portion alone.

The coupling portion 61 is illustrated alone in FIG. 4 in the form of a perspective view. Referring to FIG. 4 together with the aforementioned FIGS. 1-3, the coupling portion 61 comprises a base end frame 611, and two opposed parallel frames 612 each extending from the base end frame 611 in the sliding direction of the sliding metal frame 2, wherein the two opposed parallel frames 612 define therebetween a space 613 into which the connection portion 23 of the sliding metal frame 2 is to be inserted. Further, each of the two parallel frames 612 has: a groove-shaped recess 614 on the side of a distal end thereof, wherein the recess 614 is opened on the side opposite to the fixed metal frame; and a through-hole 615 on the side of a base end thereof (on the side of the drive device 6). Each of the pair of groove-shaped recesses 614 and the pair of through-holes 615 of the two parallel frames 612 have a common central axis extending in a direction orthogonal to the sliding direction. Ther coupling portion 61 is provided with a blocking member 10 for blocking the sliding metal frame 2 from being closed when the coupling portion 61 is located at a position below the uppermost position where the coupling portion 61 is moved to the uppermost side, although the details thereof will be described later.

On the other hand, the connection portion 23 of the sliding metal frame 2 extends from a central region thereof along a central axis extending in a longitudinal direction of the sliding metal frame 2 which is the sliding direction, and has a through-hole 231 on the side of a distal end thereof. The connection portion 23 is configured such that the distal end thereof is buttable against the base end frame 611 of the coupling portion 61 of the drive device 6, and, when they butt together, the through-holes 615, 231 are aligned with each other.

The coupling of the member body 71 of the engagement member 7 and the connection portion 23 of the sliding metal frame 2 with the coupling portion 61 of the drive device 6 will be described in more detail. When the sliding metal frame 2 is in the fully closed position, as shown in FIGS. 1(*a*) and 2(*a*), i.e., when the surface pressure is loaded between the refractory plate 4A and the refractory plate 4B, the coupling pin 8 is inserted into the through-hole 711 of the member body 71 of the engagement member 7, the through-hole 231 of the connection portion 23 of the sliding metal frame 2, and the through-holes 615 of the coupling portion 61 of the drive device 6, to thereby couple the member body 71 of the engagement member 7 and the connection portion 23 of the sliding metal frame 2 with the coupling portion 61 of the drive device 6. When the sliding metal frame 2 is in the fully closed position, the drive shaft 62 of the drive device 6 is in a forward limit position, as appearing in FIG. 2A.

Figure 5:
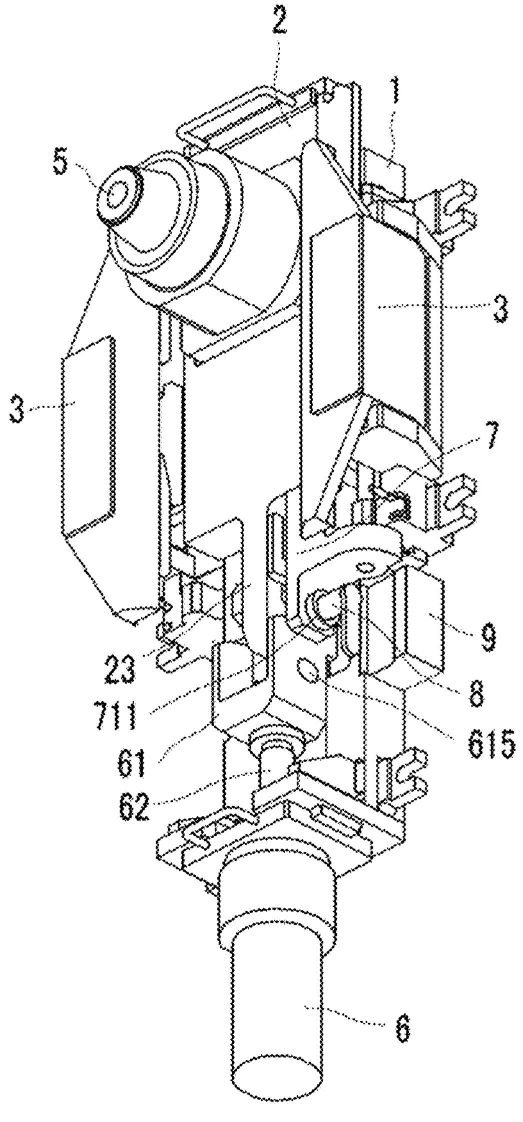
FIG. 5 is a perspective view of the sliding nozzle apparatus in the state of FIG. 1B, viewed upwardly from a position obliquely downward thereof.

Subsequently, in order to release the surface pressure between the refractory plate 4A and the refractory plate 4B, the sliding metal frame 2 is moved to the uppermost position, as shown in FIGS. 1(*b*) and 2(*b*). Specifically, in the state of FIGS. 1(*a*) and 2(*a*) in which the surface pressure is loaded, the coupling pin 8 inserted through the through-hole 711, the through-hole 231, and the through-holes 615 is pulled out, i.e., removed, therefrom. Then, the drive shaft 62 of the drive device 6 is moved backwardly, and the groove-shaped recesses 614 of the coupling portion 61 of the drive device 6 are aligned with the through-hole 711 of the member body 71 of the engagement member 7 and the through-hole 231 of the connection portion 23 of the sliding metal frame 2. Subsequently, the coupling pin 8 is inserted into the groove-shaped recesses 614 of the coupling portion 61 of the drive device 6, the through-hole 711 of the member body 71 of the engagement member 7, and the through-hole 231 of the connection portion 23 of the sliding metal frame 2 to couple them together, and then the driving shaft 62 of the drive device 6 is moved to the forward limit position. As a result, the sliding metal frame 2 is moved to the uppermost position, as shown in FIGS. 1(*b*) and 2(*b*), so that the surface pressure is released. FIG. 5 shows a perspective view of the sliding nozzle apparatus in the state of FIG. 1B, viewed upwardly from a position obliquely downward thereof.

Figure 6:
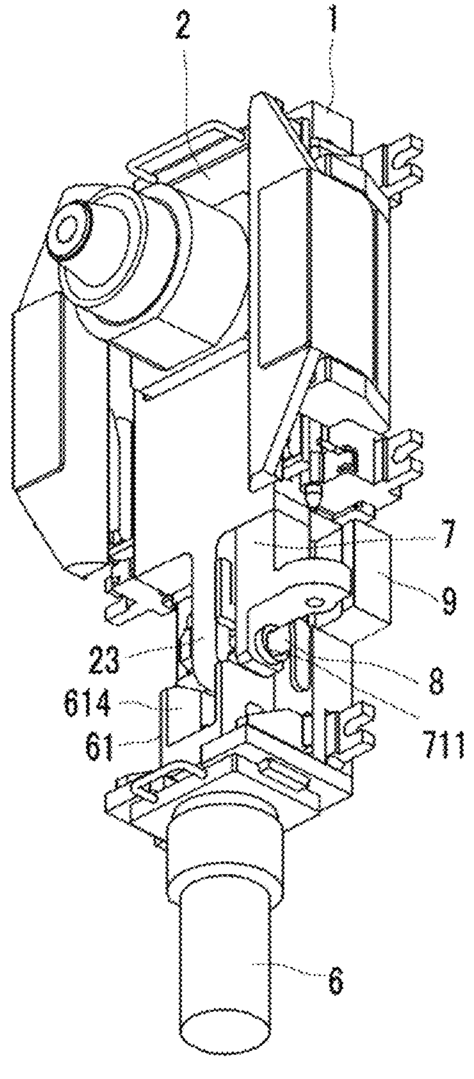
FIG. 6 is a perspective view showing a state when a drive shaft of a drive device is moved to a backward limit position from the state of FIG. 5.
Figure 7:
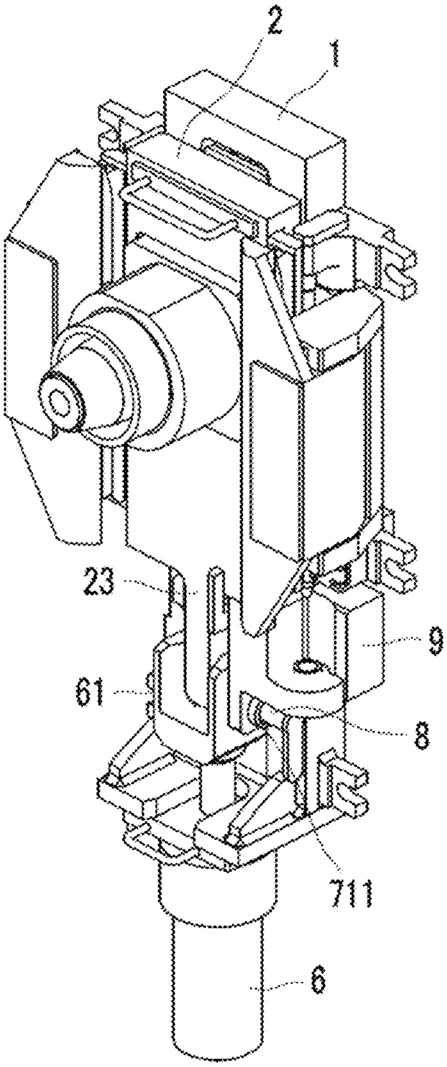
FIG. 7 is a perspective view showing a state in which a coupling state between a member body of an engagement member and a connection portion of the sliding metal frame, and the coupling portion of the drive device, is changed from the state of FIG. 6.

On the other hand, in order to load the surface pressure, the drive shaft 62 of the drive device 6 is moved backwardly from the state of FIG. 5. Thus, the sliding metal frame 2 is moved to a surface pressure loading position, as shown in FIG. 6, and the surface pressure is loaded in the course of the movement. Then, the coupling pin 8 inserted through the groove-shaped recesses 614 of the coupling portion 61 of the drive device 6, the through-hole 711 of the member body 71 of the engagement member 7, and the through-hole 231 of the connection portion 23 of the sliding metal frame 2 is removed. Then, the driving shaft 62 of the drive device 6 is moved forwardly to align the through-holes 614 of the coupling portion 61 of the drive device 6, the through-hole 711 of the member body 71 of the engagement member 7, and the through-hole 231 of the connection portion 23 of the sliding metal frame 2 with each other, and the coupling pin 8 is inserted into the through holes 615 of the coupling portion 61 of the drive device 6, the through-hole 711 of the member body 71 of the engagement member 7, and the through-hole 231 of the connection portion 23 of the sliding metal frame 2 to couple them together, as shown in FIG. 7. Then, when the drive shaft 62 of the drive device 6 is moved forwardly, the position of the sliding metal frame 2 in the sliding direction is set in the fully closed position, as shown in FIGS. 1(*a*) and 2(*a*). As described above, when the sliding metal frame 2 is in the fully closed position, the surface pressure is loaded between the refractory plate 4A and the refractory plate 4B, and the sliding nozzle apparatus is transferred to the casting field in the fully closed state.

As described above, in this embodiment, during use in the casting field, the coupling pin 8 is inserted into the through-holes 615 of the coupling portion 61 of the drive device 6, the through-hole 711 of the member body 71 of the engagement member 7, and the through-hole 231 of the connection portion 23 of the sliding metal frame 2, to thereby couple the member body 71 of the engagement member 7 and the connection portion 23 of the sliding metal frame 2 with the coupling portion 61 of the drive device 6. On the other hand, when the surface pressure is loaded or released in the maintenance field, the coupling pin 8 is inserted into the groove-shaped recesses 614 of the coupling portion 61 of the drive device 6, the through-hole 711 of the member body 71 of the engagement member 7, and the through-hole 231 of the connection portion 23 of the sliding metal frame 2, to thereby couple the member body 71 of the engagement member 7 and the connection portion 23 of the sliding metal frame 2 with the coupling portion 61 of the drive device 6.

As appearing in FIGS. 1 and 5-7, in this embodiment, the fixed metal frame 1 is provided with a fall prevention member 9. Further, the sliding metal frame 2 is provided with the engagement member 7, as described above.

Figure 8:
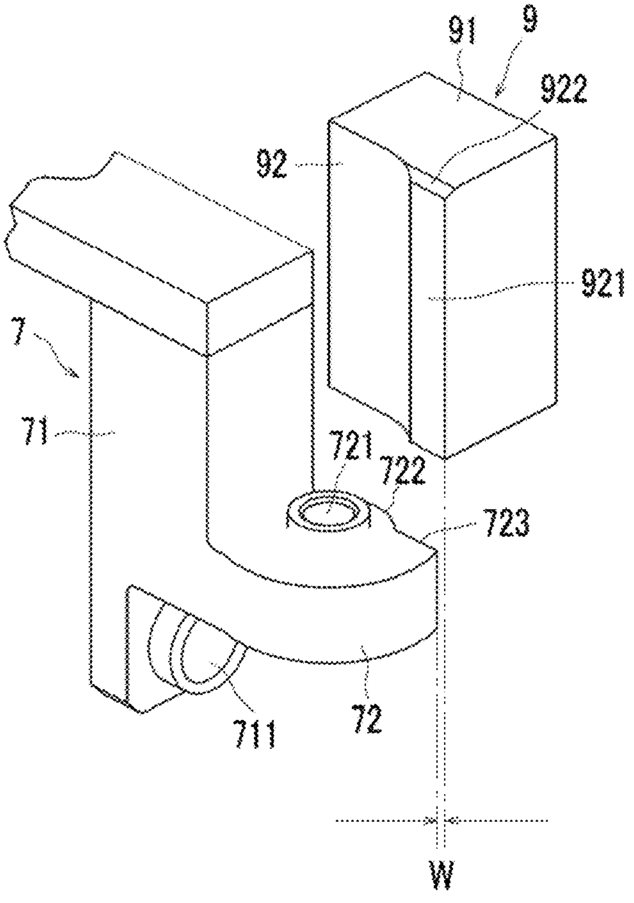
FIG. 8 is a perspective view of a fall prevention member and the engagement member each shown alone.

Each of the fall prevention member 9 and the engagement member 7 is illustrated alone in FIG. 8 in the form of a perspective view. The positional relationship between the fall prevention member 9 and the engagement member 7 in FIG. 8 is shown in a state in which the sliding metal frame 2 in the fully closed position in FIG. 1A is further moved downwardly so as to allow the shapes of the two members to clearly appear.

Figure 9:
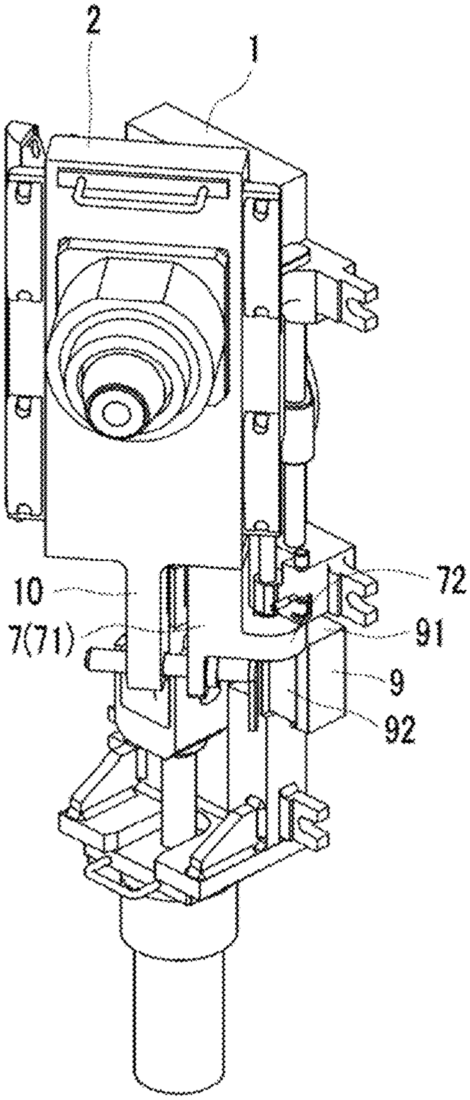
FIG. 9 is a perspective view showing a state in which the sliding metal frame 2 is slightly opened from the state of FIG. 1B, wherein illustration of spring boxes on both sides thereof, etc., is omitted.
Figure 10:
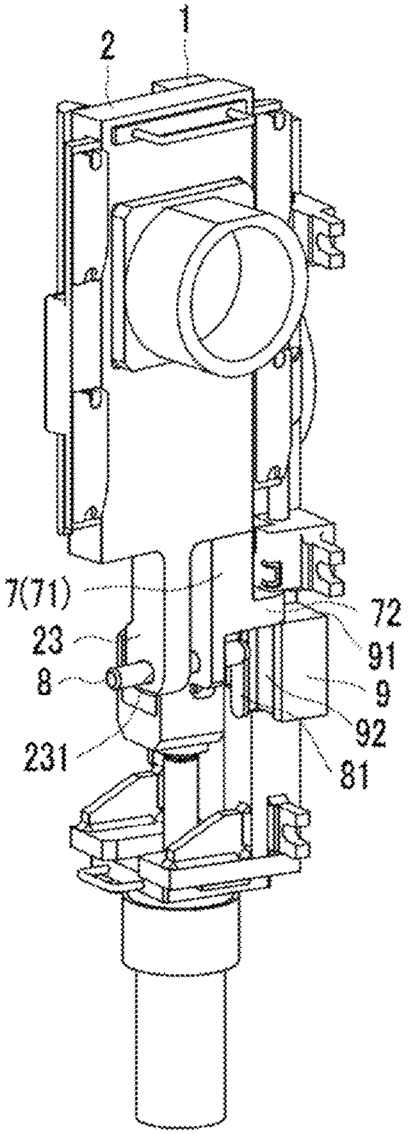
FIG. 10 is a perspective view showing a state in which the sliding metal frame is further opened from the state of FIG. 9 and fully opened, wherein illustration of the spring boxes on both sides thereof, etc., is omitted.

FIG. 9 shows a state in which the sliding metal frame 2 is slightly opened from the state of FIG. 1B, wherein illustration of the spring boxes 3 on both sides thereof, etc., is omitted. Further, FIG. 10 shows a state in which the sliding metal frame is further opened from the state of FIG. 9 and fully opened, wherein illustration of the spring boxes 3 on both sides thereof, etc., is omitted.

With reference to FIGS. 1 and 5-10, the configurations of the fall prevention member 9 and the engagement member 7 will be described. The fall prevention member 9 has a catching surface 91 for caching the engagement member 7 when the sliding metal frame 2 is opened at the uppermost position where the sliding metal frame 2 is moved to the uppermost side in a state in which the sliding nozzle apparatus is erected such that the sliding direction of the sliding metal frame 2 is oriented in the vertical direction. In this embodiment, the fall prevention member 9 further has a butting surface 92 configured to abut against the engagement member 7 when the sliding metal frame 2 is opened in a position below the aforementioned uppermost position.

In this embodiment, the engagement member 7 comprises a member body 71, and a protruding portion 72 protruding from the member body 71. The member body 71 extends along the longitudinal direction of the sliding metal frame 2 which is the sliding direction, from a position offset toward the hinge 22 with respect to the central axis extending in the longitudinal direction. Specifically, the member body 71 is provided in opposed relation to the aforementioned connection portion 23 of the sliding metal frame 2, wherein the member body 71 and the connection portion 23 define therebetween a space into which one of the two parallel frames 612 located on the side of the hinge shaft 12 is insertable.

The protruding portion 72 protrudes from the member body 71 toward the side of the hinge 22. The protruding portion 72 is configured such that a lower surface thereof is caught by the catching surface 91 of the fall prevention member 9 when the sliding metal frame 2 is opened in the uppermost position. The protruding portion 72 has an approximately quadrant shape in plan view, and has a bearing hole 721 at an approximately center of the approximately quadrant. Prior to opening the sliding metal frame 2 in the uppermost position, a lower end of the hinge shaft 12 is inserted into the bearing hole 721, so that the center of the bearing hole 721 is aligned with a central axis of the hinge shaft 12. That is, when the sliding metal frame 2 is opened, the protruding portion 72 swings about the lower end of the hinge shaft 12. As just described, the hinge shaft 12 is inserted into the bearing hole 721 prior to opening the sliding metal frame 2, so that it becomes possible to prevent wobbling of the engagement member 7 when opening the sliding metal frame 2, thereby smoothly opening the sliding metal frame 2.

As shown in FIG. 8, the protruding portion 72 has a facing surface 722 configured to face the abutting surface 92 of the fall prevention member 9 through a slight gap W. The facing surface 722 has a concave part 723 on a radially outward side when the protruding portion 72 swings about the lower end of the hinge shaft 12. On the other hand, the butting surface 92 of the fall prevention member 9 has a convex part 921 configured to fit in the concave part 723. Further, a downwardly-sloping inclined surface 922 is formed at an upper end of the convex part 921.

Here, the gap W illustrated in FIG. 8 is formed when the surface pressure is load as shown in FIG. 1A. Thus, in the sliding nozzle apparatus S according to this embodiment, there is the gap W between the facing surface 722 of the protruding portion 72 and the abutting surface 92 of the fall prevention member 9 in the surface pressure-loaded state, so that it is possible to avoid a situation where the engagement member 7 and the fall prevention member 9 are rubbed against each other and damaged when the sliding metal frame 2 is slid.

Next, a procedure for opening and closing the sliding metal frame 2 will be described.

As described above, prior to performing maintenance of the sliding nozzle apparatus, the sliding nozzle apparatus is carried into the maintenance field in the fully closed state in which the sliding metal frame 2 is in the fully closed position, and is then erected such that the sliding direction of the sliding metal frame 2 is oriented in the vertical direction, as shown in FIGS. 1A and 2A. In this fully closed state, the surface pressure is loaded between the refractory plate 4A and the refractory plate 4B.

Subsequently, the sliding metal frame 2 is moved to the uppermost position, as shown in FIGS. 1B, 2B and 5, to release the surface pressure. The procedure for moving the sliding metal frame 2 from the fully closed position to the uppermost position is as described above.

When the sliding metal frame 2 is moved to the uppermost position, the lower end of the hinge shaft 12 is inserted into the bearing hole 721 provided in the protruding portion 72 of the engagement member 7. Further, the height level of the lower surface of the protruding portion 72 of the engagement member 7 is coincident with the height level of the catching surface 91 of the fall prevention member 9. From this state, when the sliding metal frame 2 is swung about the hinge shaft 12 in an open direction, the lower surface of the protruding portion 72 of the engagement member 7 is caught by the catching surface 91 of the fall prevention member 9, as shown in FIGS. 9 and 10, during swinging of the sliding metal frame 2 in the opening direction. Here, the facing surface 722 facing the butting surface 92 of the fall prevention member 9 through the slight gap W has the concave part 723 on the radially outward side thereof, and the butting surface 92 of the fall prevention member 9 has the convex part 921 fittable in the concave part 723, wherein the upper end of the convex part 921 has the downwardly-sloping inclined surface 922. Thus, when the sliding metal frame 2 is swung in the open direction, the radially outward surface of the lower surface of the protruding portion 72 is immediately guided by the inclined surface 922, and smoothly caught by the catching surface 91 of the fall prevention member 9.

Figure 11:
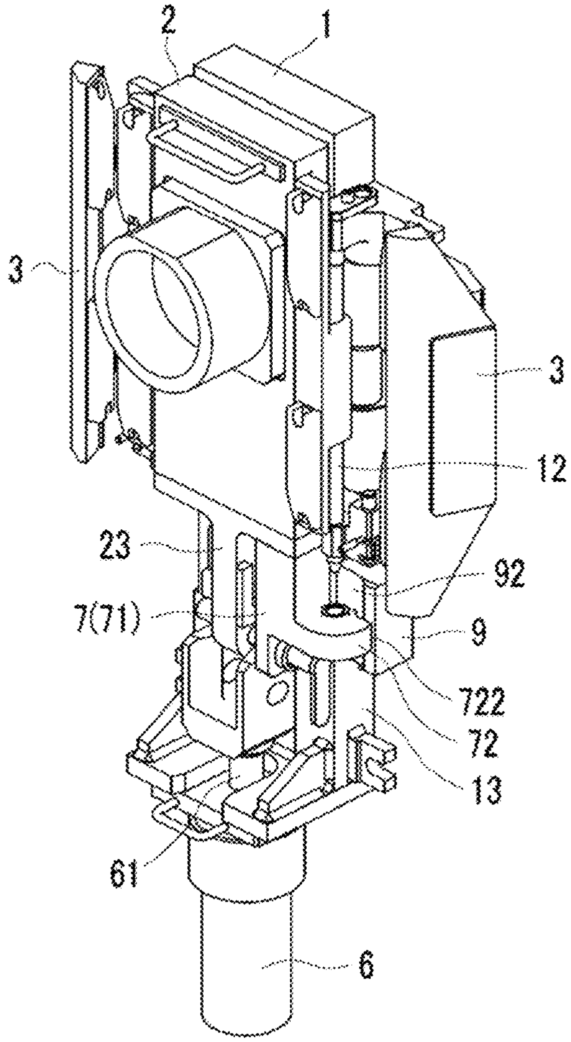
FIG. 11 is a perspective view showing a state when an operation of erroneously moving the drive shaft of the drive device backwardly is performed during maintenance.
Figure 12:
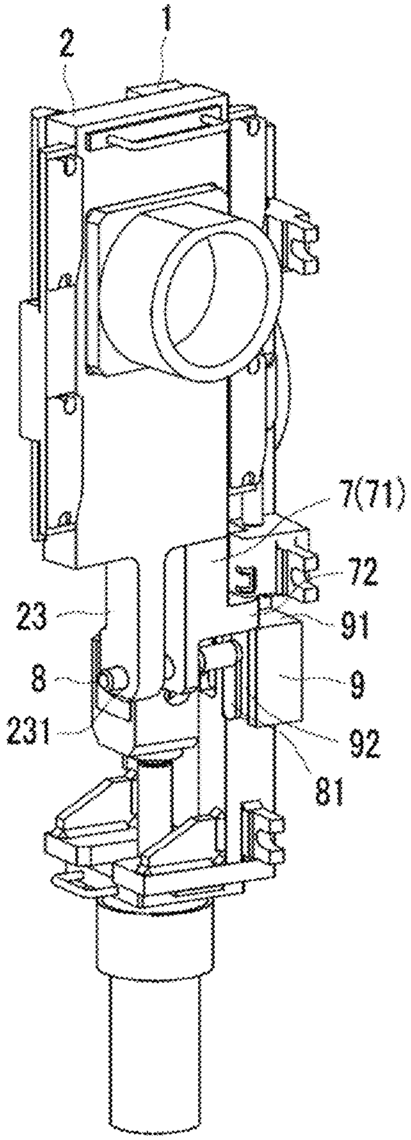
FIG. 12 is a perspective view showing a state in which the fall prevention member restricts displacement of a coupling pin when the sliding metal frame is opened.

Further, in this process, the coupling portion 61 of the drive device 6 is also at the uppermost position, so that the blocking member 10 provided in the coupling portion 61 can pass through the space between the member body 71 of the engagement member 7 and the connection portion 23 when the sliding metal frame 2 is swung in the open direction, i.e., does not become an obstacle to the opening and closing of the sliding metal frame On the other hand, when the sliding metal frame 2 is opened at a position below the uppermost position, such as a position after an operation of erroneously moving the drive shaft 62 of the drive device 6 backwardly during maintenance, as shown in FIG. 11, the facing surface 722 of the protruding portion 72 of the engagement member 7 abuts against the butting surface 92 of the fall prevention member 9. Therefore, the sliding metal frame 2 cannot be opened in a position below the uppermost position, for example, in a state in which the sliding metal frame 2 is in the position illustrated in FIG. 11.

As just described, in this embodiment, the sliding metal frame 2 can be opened only when the sliding metal frame 2 is in the uppermost position, and the sliding metal frame 2 cannot be opened when the sliding metal frame 2 is located in a position below the uppermost position. Further, when the sliding metal frame 2 is opened when the sliding metal frame 2 is in the uppermost position, the lower surface of the protruding portion 72 of the engagement member 7 is caught by the catching surface 91 of the fall prevention member 9 as described above, so that it is possible to prevent the sliding metal frame 2 from falling down.

As appearing in FIG. 10, in a state in which the sliding metal frame 2 is fully opened, one end of the coupling pin 8 inserted through the through-hole 711 of the member body 71 of the engagement member 7 and the through-hole 231 of the connection portion 23 of the sliding metal frame 2, i.e., an end of the coupling pin 8 on the side of the hinge 22 is opposed to the butting surface 92 of the fall prevention member 9. Thus, even if the coupling pin 8 is moved toward the side of the hinge 22, the end of the coupling pin 8 on the side of the hinge 22 abuts against the butting surface 92 of the fall prevention member 9, thereby restricting the movement of the coupling pin 8 toward the side of the hinge 22, to prevent the coupling pin 8 from falling off from the through-hole 711 of the member body 71 of the engagement member 7 and the through-hole 231 of the connection portion 23 of the sliding metal frame 2. In this embodiment, a handle 81 is provided at the end of the coupling pin 8 on the side of the hinge 22, and this handle 81 restricts a movement of the coupling pin 8 toward a side opposite to the side of the hinge 22. Specifically, even if the coupling pin 8 is moved to the side opposite to the side of the hinge 22, the handle 81 of the coupling pin 8 abuts against a lateral surface of the member body 71 of the engagement member 7 on the side of the hinge 22, thereby restricting the movement of the coupling pin 8 toward the side opposite to the side of the hinge 22, to prevent the coupling pin 8 from falling off from the through-hole 711 of the member body 71 of the engagement member 7 and the through-hole 231 of the connection portion 23 of the sliding metal frame 2.

Next, when the sliding metal frame 2 is closed, the sliding metal frame 2 is swung in a closing direction in the order of FIG. 10, FIG. 9, and FIG. 5, reversely to the aforementioned opening procedure. Specifically, in the state of FIGS. 10 and 9, the sliding metal frame 2 is swung in the closing direction while the lower surface of the protruding portion 72 of the engagement member 7 is caught by the catching surface 91 of the fall prevention member 9. Then, even when the sliding metal frame 2 is swung in the closing direction until the lower surface of the protruding portion 72 of the engagement member 7 is not caught by the catching surface 91 of the fall prevention member 9, the coupling pin 8 is inserted into the groove-shaped recessed portion 614 of the coupling portion 61 of the drive device 6, to finally become the state of FIG. 5. As just described, in this embodiment, it is possible to prevent the sliding metal frame 2 from falling down when the sliding metal frame 2 is closed.

Here, in the state of FIGS. 10, 9, and 5, the coupling portion 61 of the drive device 6 is also in the uppermost position, so that the blocking member 10 provided in the coupling portion 61 can pass through the space between the member body 71 of the engagement member 7 and the connection portion 23 when the sliding metal frame 2 is swung in the closing direction, i.e., does not becomes an obstacle when the sliding metal frame 2 is closed.

Figure 13:
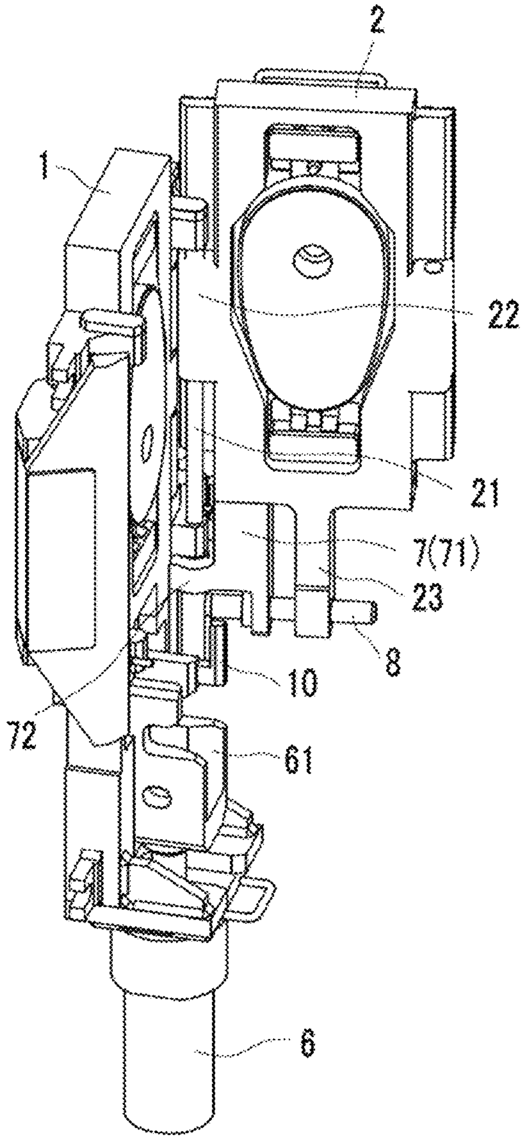
FIG. 13 is a perspective view showing a state in which the coupling portion of the drive device is moved to a position below the uppermost position in FIG. 3.
Figure 14:
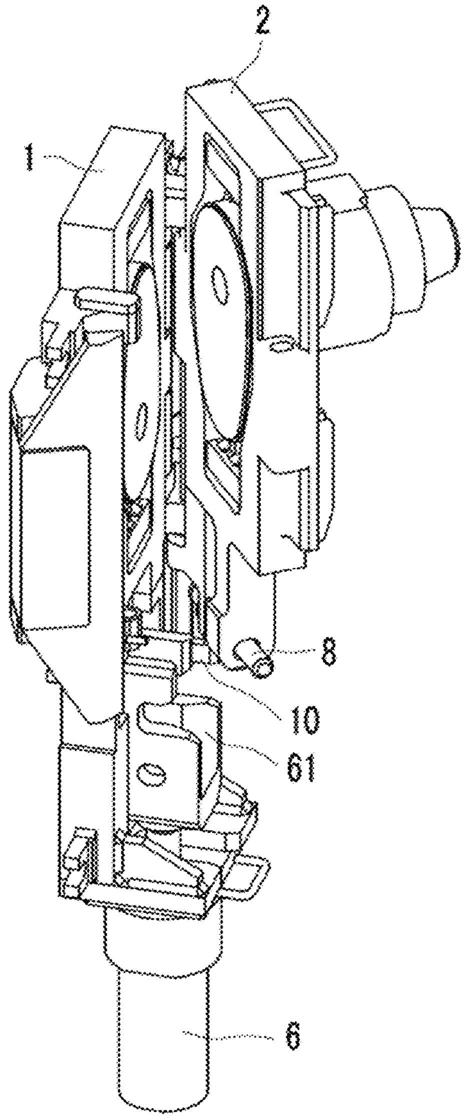
FIG. 14 is a perspective view showing an action of a blocking member when it is attempted to close the sliding metal frame from the state of FIG. 13.

On the other hand, when the coupling portion 61 of the drive device 6 is located in a position below the uppermost position due to erroneous operation of the drive device 6, etc., as shown in FIG. 13, the coupling pin 8 inserted through the through-hole 711 of the member body 71 of the engagement member 7 and the through-hole 231 of the connection portion 23 of the sliding metal frame 2 abuts against the blocking member 10, as shown in FIG. 14. Thus, the sliding metal frame 2 cannot be closed.

In this embodiment, when the coupling pin 8 abuts against the blocking member 10, as shown in FIG. 14, the protruding portion 72 of the engagement member 7 is caught by the catching surface 91 of the fall prevention member 9. Thus, when the sliding metal frame 2 is closed in a situation where the coupling portion 61 of the drive device 6 is moved to a position below the uppermost position, it is also possible to prevent the sliding metal frame 2 from falling down.

As just described, in this embodiment, the blocking member 10 prevents the sliding metal frame 2 from being closed when the coupling portion 61 of the drive device 6 is located in a position below the uppermost position. If the sliding metal frame 2 can be closed when the coupling portion 61 of the drive device 6 is located in a position below the uppermost position, the sliding metal frame 2 is likely to fall down when the sliding metal frame 2 is swung in the closing direction until the lower surface of the protruding portion 72 of the engagement member 7 is not caught by the catching surface 91 of the fall prevention member 9.

As above, according to this embodiment, it is possible to prevent the sliding metal frame 2 from falling down when the sliding metal frame 2 is opened at the uppermost position where the sliding metal frame 2 is moved to the uppermost side, and further prevent the sliding metal frame 2 from falling down when the sliding metal frame opened at the uppermost position is closed.

In this embodiment, the drive device 6 is located below the sliding metal frame 2 in the state in which the sliding nozzle apparatus is erected such that the sliding direction of the sliding metal frame 2 is oriented in the vertical direction. Alternatively, the drive device 6 may be located above the sliding metal frame 2 in the above state. In this case, the sliding metal frame 2 is also opened and closed in the uppermost position where the sliding metal frame 2 is moved to the uppermost side.

On the other hand, in a conventional sliding nozzle apparatus, when a drive device is located above a sliding metal frame, the sliding metal frame is generally opened and closed in the lowermost position where the sliding metal frame is moved to the lowermost side. This is because of preventing the sliding metal frame from falling down during the opening and closing. Thus, it is conceivable that when the drive device 6 is located below the sliding metal frame 2 as in the above embodiment, the sliding metal frame 2 is opened and closed in the uppermost position where the sliding metal frame 2 is moved to the uppermost side, and when the drive device 6 is located above the sliding metal frame 2, the sliding metal frame 2 is opened and closed in the lowermost position where the sliding metal frame 2 is moved to the lowermost side. In this case, the design of the support frame 13 supporting the drive device 6 can be communalized in two cases where the drive device 6 is located above the sliding metal frame 2 and located below the sliding metal frame 2. From this point, in the present invention, it is preferable that the drive device 6 is located below the sliding metal frame 2 in the state in which the sliding nozzle apparatus is erected such that the sliding direction of the sliding metal frame 2 is oriented in the vertical direction, prior to opening the sliding metal frame 2, as in the above embodiment.

LIST OF REFERENCE SIGNS

S: sliding nozzle apparatus
1: fixed metal frame
11: plate-receiving recess
12: hinge shaft
13: support frame
2: sliding metal frame
21: plate-receiving recess
22: hinge
23: connection portion
231: through-hole
3: spring box
4A, 4B: refractory plate
4A-1, 4B-1: nozzle hole
5: lower nozzle
6: drive device
61: coupling portion
611: base end frame
612: parallel frame
613: space
614: groove-shaped recess
615: through-hole
62: drive shaft
7: engagement member
71: member body
711: through-hole
72: protruding portion
721: bearing hole
722: facing surface
723: concave part
8: coupling pin
81: handle
8: fall prevention member
91: engagement surface
92: butting surface
921: convex part
922: inclined surface
10: blocking member

The invention claimed is:

1. A sliding nozzle apparatus comprising a fixed metal frame, and a sliding metal frame which is provided openably-closably and slidably with respect to the fixed metal frame, wherein the sliding nozzle apparatus is erected such that a sliding direction of the sliding metal frame is oriented in a vertical direction, prior to opening the sliding metal frame, wherein the fixed metal frame is provided with a fall prevention member, and the sliding metal frame is provided with an engagement member, wherein the fall prevention member has a catching surface for catching the engagement member, when the sliding metal frame is opened in an uppermost position where the sliding metal frame is moved to an uppermost side in a state in which the sliding nozzle apparatus is erected such that the sliding direction of the sliding metal frame is oriented in the vertical direction.

2. The sliding nozzle apparatus as claimed in claim 1, wherein the fall prevention member has a butting surface configured to butt against the engagement member when the slide metal frame is opened in a position below the uppermost position.

3. The sliding nozzle apparatus as claimed in claim 1, wherein the engagement member comprises a member body, and a protruding portion protruding from the member body, the protruding portion being configured to be caught by the catching surface of the fall prevention member when the sliding metal frame is opened in the uppermost position.

4. The sliding nozzle apparatus as claimed in claim 3, wherein the fixed metal frame is provided with a hinge shaft swingably supporting the slidable metal frame, and the protruding portion has a bearing hole, wherein the hinge shaft is inserted into the bearing hole prior to opening the sliding metal frame.

5. The sliding nozzle apparatus as claimed in claim 1, wherein the sliding metal frame comprises a connection portion to be coupled with a coupling portion of a drive device for sliding the sliding metal frame, wherein the sliding nozzle apparatus comprises a pin which is inserted through the connection portion and the engagement portion to couple the connection portion and the engagement portion together, wherein the fall prevention member is configured to restrict displacement of the pin when the sliding metal frame is opened.

6. The sliding nozzle apparatus as claimed in claim 5, wherein the coupling portion of the drive device is provided with a blocking member for blocking the sliding metal frame from being closed when the coupling portion is located in a position below an uppermost position where the coupling portion is moved to an uppermost side.

7. The sliding nozzle apparatus as claimed in claim 1, comprising a drive device for sliding the sliding metal frame, wherein the drive device is located below the sliding metal frame, in the state in which the sliding nozzle apparatus is erected state such that the sliding direction of the sliding metal frame is oriented in the vertical direction, prior to opening the sliding metal frame.

* * * * *